Patented July 26, 1932

1,869,155

UNITED STATES PATENT OFFICE

KURT KLUG, OF BERLIN-CHARLOTTENBURG, GERMANY, ASSIGNOR TO LOCOMOTIVE BOOSTER COMPANY, OF NEW YORK, N. Y., A CORPORATION OF DELAWARE

BOOSTER EQUIPPED LOCOMOTIVE

Application filed January 29, 1932, Serial No. 589,610, and in Germany September 9, 1930.

This invention relates to improvements in booster equipped locomotives and in particular to locomotives equipped with high pressure booster motors.

One of the primary objects of my invention is to increase the effectiveness of high pressure locomotives.

A more specific object of my invention resides in utilizing a three-cylinder booster motor.

How the foregoing, together with such other objects and advantages as may hereinafter appear, or are incident to my invention, are realized, is illustrated in preferred form in the accompanying drawings, wherein.

Figure 1:
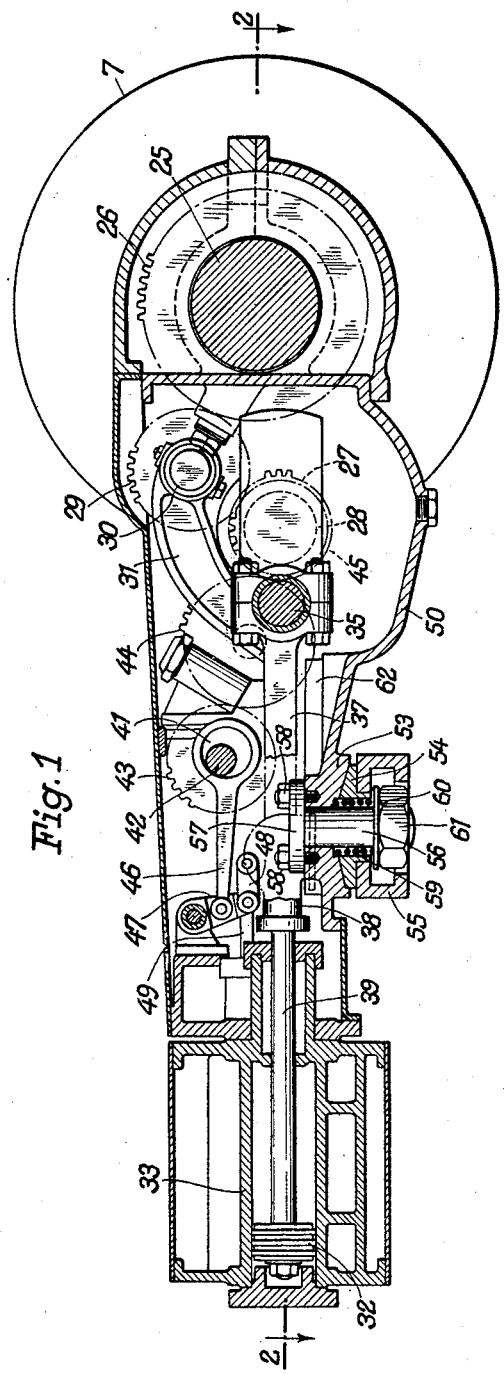
Figure 1 is a sectional elevational view of a booster motor with which the locomotive is equipped, the section being taken substantially on the line 1—1 of Figure 2.

In these figures I have illustrated the booster motor as being of the three-cylinder type and particularly adapted to be operated by high pressures. The axle 25 of the trailing wheels 7 of the locomotive runs in bearings (not shown) located outside of the wheels and mounted on the frame of the locomotive or truck in the usual manner. This axle carries a gear 26 adapted to be driven by the booster motor through the medium of the driving pinion 27 keyed on the crank shaft 28 and the idler gear 29 with which the pinion 27 is permanently engaged. The idler gear 29 has its shaft 30 mounted at the free end of a rocking member 31 which is adapted to be moved in a direction to cause engagement and disengagement of the gear 29 with the gear 26 by means of a well known air pressure or similar device which may be controlled from the cab of the locomotive.

The pistons 32 of the three cylinders 33 are connected to the crank pins 34, 35 and 36 of the crank shaft 28 by means of connecting rods 37, cross heads 38 and piston rods 39. The admission of steam to the cylinders is regulated by piston or plug valves 40 operated by means of eccentrics 41. The eccentrics 41 are secured to a shaft 42 carrying a gear 43 meshing with an idler gear 44 in turn meshing with a gear 45 secured on the crank shaft 28. This gearing is so designed that the eccentric shaft 42 makes the same number of revolutions in the same direction as the crank shaft 28. The eccentrics 41 cause reciprocation of the valves 40 thru the medium of the arms 46, levers 47 and links 48 connected to the valve rods 49, the arrangement being such as to provide a ratio of 2 to 1.

A three-cylinder booster motor of the above character allows full advantage to be taken of high steam pressures since the cut-off can be safely made as low as 35 or 40 percent without sacrificing efficiency at starting. In utilizing high steam pressures, the cylinders may be made small enough in diameter to be installed in the very limited space available. In this connection it is pointed out that where high boiler pressures are employed, the use of three or more cylinders, each of comparatively small diameter, overcomes the danger of slipping the booster wheels which might very well take place were conventional two-cylinder booster motors employed. Considerable difficulty is encountered, however when the frame of the three-cylinder booster is to be suspended in three points, as it is usual with two-cylinder boosters. When suspending the frame in three points the frame is usually carried by two bearings running on the axle driven by the booster and by a centre bearing on a cross bar serving as third suspension point, which cross bar is supported at its ends on the locomotive frame and buffered by springs. Now the difficulty is, that the centre-bearing of the three-point suspension would interfere with the crosshead guide of the middle cylinder. According to the invention this difficulty is overcome by moving the inner cylinder 33 laterally so far from the frame centre that the centre bearing of the three-point suspension can be mounted by the side of the crosshead guide of this cylinder, and, further, by moving the gear wheel 26 on the axle 25 so far to the opposite side, that the mass centre will fall in the centre plane.

Figure 2:
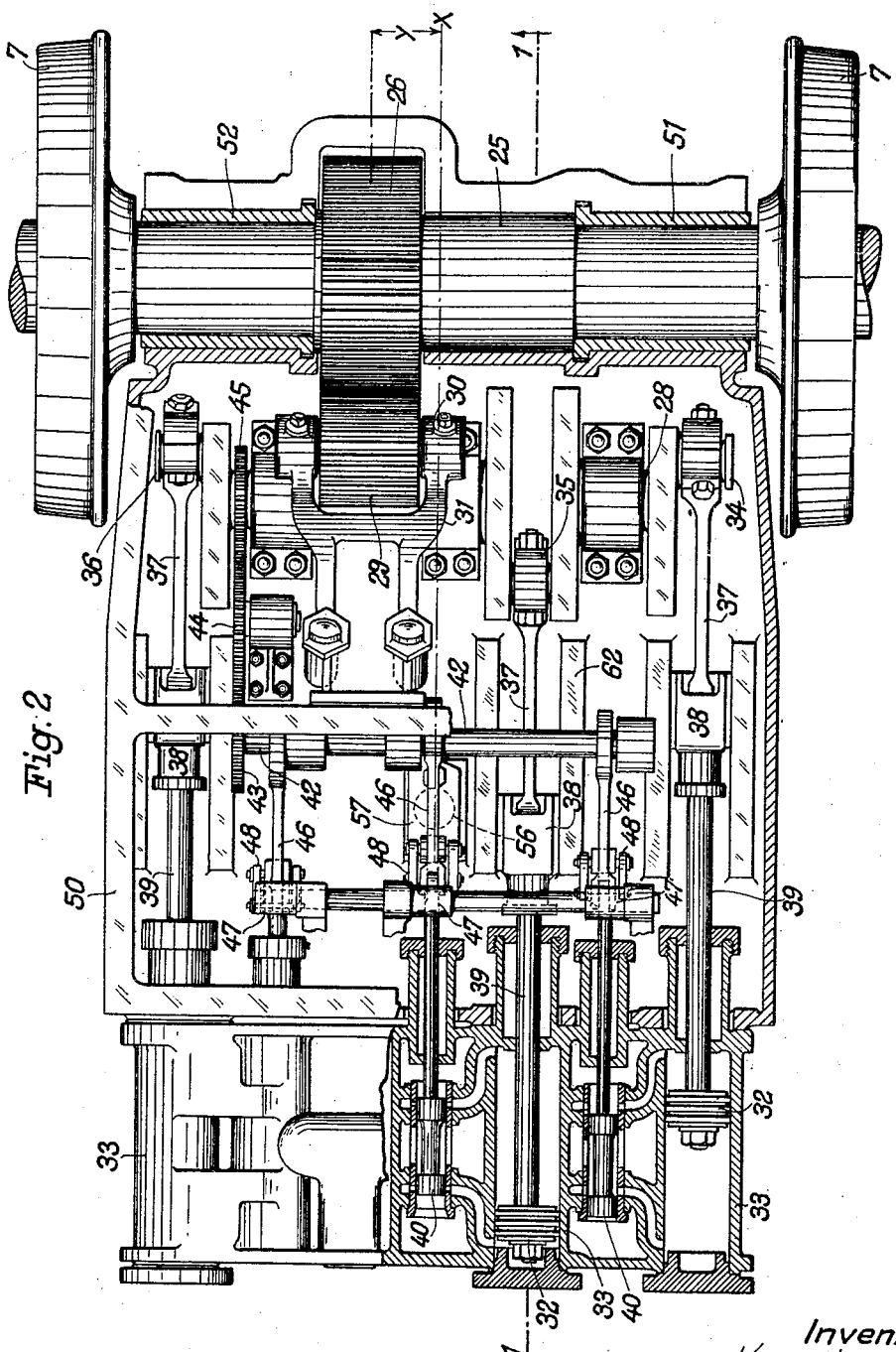
Figure 2 is a plan view of Figure 1, partly in section on the line 2—2 of Figure 1.

In Fig. 2 $y$ is the distance, by which the pinion 29 has been moved out of the centre plane $x$ of the frame 50. The frame 50 is suspended on the axle 25 by the bearings 51 and 52. The third suspension point of the frame 50 lies in the centre plane x. As shown in Fig. 2, the frame 50 bears a centre pin socket 53 which rests on a spherical pivot 54 fixed in a cross bar 55. The cross bar is elastically supported on both sides by the locomotive frame in the known manner which is not shown here. The spherical pin 54 and the socket 53 are held together, by a bolt 56 passing thru central holes in the socket 53 and the spherical pin 54 and carrying at its upper end a flange 57, which flange is fixed to the socket 53 of frame 50 by studs 58. The bolt 56 fits snugly in the hole of the socket 53 but has ample clearance in the hole of the pin 54. In this clearance space a spring 59 is put round the bolt. This spring bears with one end against the under side of the socket 53, with the other end against a washer 60 resting on a nut at the lower end of the bolt 56.

The middle cylinder 33 and the crank pin of the corresponding crank axle 28 are so far distant from the centre plane x of frame 50, that the corresponding crosshead guide 62 can be placed alongside the flange 57 of the bolt 56 of the centre bearing. At the same time, when the middle cylinder and the corresponding parts are moved laterally to one side and the wheel gear for the trailing axle to the opposite side of the central plane, the resulting distribution of weight will be such as to bring the centre of gravity of the total mass of the frame 50 and of the parts supported by it into the central plane x. As shown in the drawings the gearing, which connects the intermediate shaft 42 to the crank shaft 28, is located at the same side of the central plane x as the gearing for the trailing axle 25.

I claim:

1. In a locomotive equipped with a booster, a three-cylinder booster motor, a booster frame suspended in three points, a crank shaft driven by the booster motor, a trailing axle connected with the crank shaft by a gearing, the middle cylinder of the booster motor being moved laterally to one side and the gearing for the trailing axle to the opposite side of the central plane of the booster frame, the resulting distribution of weight being such as to bring the centre of gravity of the total mass of said frame and of the parts supported by it substantially into said central plane.

2. In a locomotive equipped with a booster, a three-cylinder booster motor, a booster frame suspended in three points, a crank shaft driven by the booster motor, a trailing axle connected with the crank shaft by a gearing, the middle cylinder of the booster motor being moved laterally to one side and the gearing for the trailing axle to the opposite side of the central plane of the booster frame, valves for regulating the admission of steam to the cylinders of the booster motor, said valves being operated by means of eccentrics secured to an intermediate shaft, which shaft is connected by a gearing to the crank shaft, said gearing being located at the same side of the central plane as the gearing for the trailing axle.

In testimony whereof I have hereunto signed my name.

KURT KLUG.